Nov. 29, 1955  B. T. WRIGHT  2,725,478
APPARATUS FOR THE SEPARATION OF MATERIALS
Filed July 19, 1945  7 Sheets-Sheet 2

INVENTOR.
Byron T. Wright.
BY

Fig. 4

INVENTOR.
Byron T. Wright

Nov. 29, 1955  B. T. WRIGHT  2,725,478
APPARATUS FOR THE SEPARATION OF MATERIALS
Filed July 19, 1945  7 Sheets-Sheet 4

Fig. 5

INVENTOR.
Byron T. Wright
BY
Robert A. Lavender

Nov. 29, 1955     B. T. WRIGHT     2,725,478
APPARATUS FOR THE SEPARATION OF MATERIALS
Filed July 19, 1945     7 Sheets-Sheet 5

INVENTOR.
Byron T. Wright.
BY
Robert A. Lavender

INVENTOR.
Byron T. Wright
BY

United States Patent Office 2,725,478
Patented Nov. 29, 1955

2,725,478

APPARATUS FOR THE SEPARATION OF MATERIALS

Byron T. Wright, Santa Fe, N. Mex., assignor to the United States of America as represented by the United States Atomic Energy Commission Application July 19, 1945, Serial No. 605,959

12 Claims. (Cl. 250—41.9)

The present invention relates to mass spectro-separation and particularly to a device for altering the distribution of isotopes in a polyisotopic material. More specifically, the invention relates to the class of devices known as "calutrons," a term which has been defined as "any apparatus or machine wherein isotope separation or enrichment is achieved on a large scale yielding commercially useful quantities of one or more isotopes, by appropriate separative action on gaseous ions with electrostatic or electromagnetic means or combinations of them."

The foregoing definition has been adopted from an application for Letters Patent of the United States, Serial No. 557,784, filed October 9, 1944, by Ernest O. Lawrence, now Patent No. 2,709,222. In the application the nature of a calutron and the theory of its operation have been so fully treated that no useful purpose would be served by repeating the discussion.

Briefly speaking, a calutron comprises a vessel or tank evacuated to $10^{-4}$ or $10^{-5}$ mm. Hg and disposed within a powerful magnetic field. Within the tank is disposed apparatus for ionizing vapor of a polyisotopic material such as uranium, accelerating electrodes for projecting ions as a beam traversing the tank, and a receiver in the path of the beam for collecting separate masses of material in which the distribution of isotopes has been altered from that occurring in the starting material. The flux in the magnetic field bends the beam into a curve wherein ions of the heavier isotopes are concentrated along the outer periphery, while ions of the lighter isotopes tend to congregate along the inner periphery of the curve. In other words, the path of the ions of greater mass follows a curve having a greater radius than that of the path of the ions of less mass.

The path of the beam as a whole depends primarily upon the strength of the magnetic field and the velocity imparted to the ions by the accelerating electrodes; the greater the velocity, the greater the radius of the curve, and the radius thereof also varies inversely with the strength of the field. With a magnet of given strength, it is comparatively easy to increase the intensity of the beam by increasing the voltage drop between the ion source and the accelerating electrodes. However, the extent and power of the magnet have hitherto constituted limiting factors rendering it impossible to increase the intensity of the beam to desirable standards.

The most important object of the present invention is to improve the efficiency of the calutron by increasing the intensity of the beam of ions beyond the limit hitherto imposed by the strength and boundaries of the magnetic field.

Another object of the invention is to provide means for controlling the path of the beam in a calutron independently of the initial velocity of the ions and the strength of the magnetic field.

A further object of the invention is to reduce the strength of the magnetic field necessary for the efficient operation of a calutron.

A salient feature of the invention resides in the provision of auxiliary electrodes disposed adjacent the accelerating electrodes and maintained at a potential less negative than the accelerating electrodes for the purpose of reducing the velocity of the ions before they traverse the tank.

These and other objects and features of the invention will more readily be understood and appreciated from the following detailed description of a preferred embodiment thereof selected for purposes of illustration and shown in the accompanying drawings in which:

In order that the factors affecting the operation of apparatus embodying the invention may be appreciated, a prefatory discussion of the general organization of a calutron will be undertaken in advance of a detailed description of a complete embodiment of the invention. The task is approached with some hesitancy in view of the fact that the concepts of atomic physics are admittedly plastic and presently undergoing extensive re-examination and modification. It is to be emphasized, therefore, that the following exposition is based upon hypotheses representing the considered opinions of men pre-eminent in the art rather than laws demonstrated to be true beyond cavil.

The goal is to provide an apparatus in which a quantity of material may be divided into a plurality of aggregates as the result of the separating effect of a magnetic field upon ions of different mass drawn from the charge material. By the term "charge material," or "charge," is meant the material initially placed in the apparatus for treatment thereby. For example, normally occurring uranium comprises the three isotopes $U^{234}$, $U^{235}$, and $U^{238}$. By ionizing the vapor of a uranium compound and subjecting the ions to the separative action of a magnetic field, two aggregates may be collected of which one is enhanced with respect to its percentage of $U^{235}$ and $U^{234}$, whereas the other is correspondingly impoverished with respect thereto.

Figure 1:
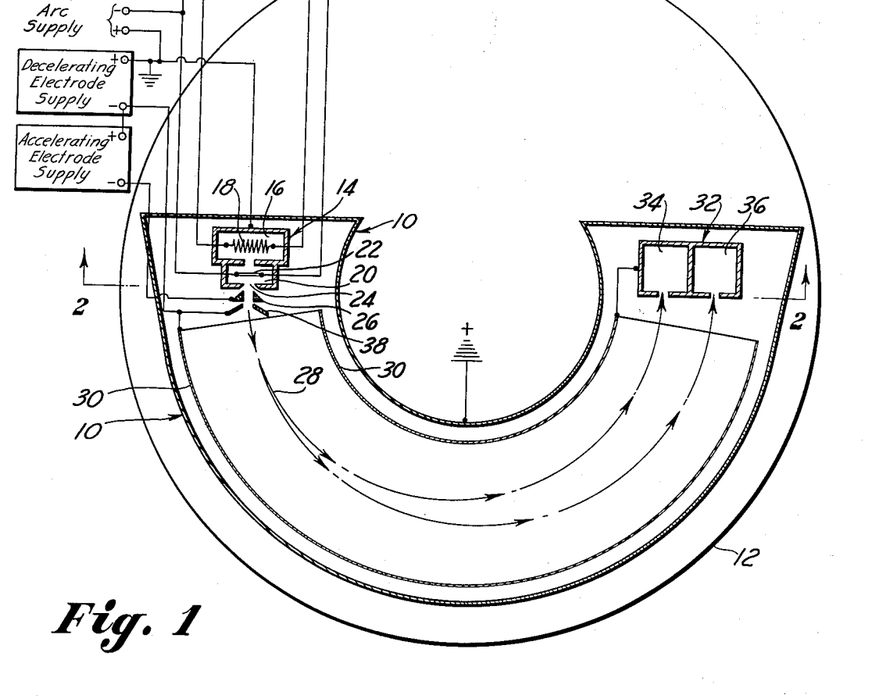
Figure 1 is a diagrammatic view partly in plan and partly in cross section of a calutron embodying the invention.

To accomplish enhancement, or separation, apparatus of the type diagrammatically represented in Fig. 1 is utilized, including an arcuate tank or vessel 10 interposed between the poles of a magnet and evacuated to a pressure of the order of $10^{-4}$ or $10^{-5}$ mm. Hg. The pole faces of the magnet are indicated at 11 and 12 in Fig. 2, and the flux direction is shown by the arrows 13. Adjacent one end of the tank is disposed an ionizing mechanism including a block 14 provided with a heating or vaporizing chamber 16 within which a quantity of charge material is adapted to be vaporized by heat supplied from an electric heater 18. The block 14 also contains an arc chamber 20 into which vapor flows from the heating chamber 16 and is ionized and dissociated by an arc traveling from a filamentary cathode 22 down through the chamber and behind a narrow exit slit 24. The electrons of the arc impinge upon the molecules of vapor entering the arc chamber 20 and ionize them. $UCl_4$, for example, is largely converted to negative chlorine ions and positive ions of $U^{234}$, $U^{235}$, and $U^{238}$. Consequently there is produced in the arc chamber 20 a "plasma," or region substantially electrically neutral but containing copious quantities of ions. The plasma may bulge through the exit slit 24 in convex form or bend inwardly therefrom in concave form, according to the strength of the electric field immediately in advance of the slit 24.

Positive ions may be withdrawn from the plasma and accelerated to form a beam by means of a pair of accelerating electrodes 26 disposed, adjacent the slit 24 and outside the arc block 14. The accelerating electrodes 26 are rendered highly negative with respect to the block 14. Accordingly, there is a large potential gradient extending therebetween, and positive ions are drawn from the plasma, accelerated to high velocities by the extensive voltage drop, and formed into a narrow ribbon or beam 28 traversing the tank 10 in a path perpendicular to the direction of the flux between the poles of the magnet. The density and speed of the ions in the beam vary as a direct function of the voltage drop from the block 14 to the accelerating electrodes 26. Apparatus of the type described has been successfully operated with as much as a 30 kilovolt drop.

Within the tank 10 is a tubular liner 30 suitably insulated from the walls of the tank 10 and curved to follow its contour. The liner is open at one end to receive the beam 28 and open at the opposite end that the beam may debouch into a receiver or collector 32 provided with a pair of spaced pockets 34 and 36. The magnetic field forces the beam 28 to follow a curved path the radius of which varies inversely with the density of the flux. Inasmuch as the energy imparted to all of the ions is substantially the same, it follows that ions of larger mass are less influenced by the flux than lighter ions. Consequently the heavier ions, such as $U^{238}$, tend to concentrate along the outer periphery of the beam path and lighter ions, such as $U^{234}$ and $U^{235}$, congregate along the inner periphery thereof, or, in other words, follow a curve of slightly less radius. The pockets 34 and 36 of the collector 32 are so disposed that the pocket 34 intercepts that portion of the beam relatively rich in the lighter ions, while the pocket 36 collects that portion of the beam impoverished with respect to the lighter ions.

The velocity imparted to the ions by the accelerating electrodes 26 and the strength of the magnetic field are factors which determine the path the beam follows. The radius of the curve followed by the beam increases with an increase in accelerating voltage and decreases with an increase in the strength of the magnetic field. The density, or number of ions in the beam is directly responsive to the accelerating voltage. Consequently, for practical purposes, the area or extent as well as the strength of the magnetic field limits the density of the beam. However, the present invention contemplates raising the limit by interposing a pair of decelerating electrodes 38 so closely adjacent the accelerating electrodes that the path of the beam is modified to follow a curve of shorter radius than would be the case if the ions were permitted to retain their initial velocity derived from the accelerating electrodes 26. A high potential may thus be applied to the accelerating electrodes to withdraw a copious supply of ions from the plasma and to form thereby a dense beam; the decelerating electrodes are at a potential intermediate that of the arc block 14 and the accelerating electrodes 26. Consequently the desirably dense beam is reduced in speed to a point where the magnetic field can deflect it into a predetermined curved path and into the collector pockets 34 and 36.

It will be apparent that instead of increasing the accelerating voltage to produce a denser beam, the decelerating electrodes may be used to permit operation of a calutron with lower flux density. That is to say, in a calutron operated without decelerating electrode structure and with given flux density and accelerating voltage, the interposition of decelerating electrodes and the consequent shortening of the radius of the curve of the beam path may be compensated for by reducing the current flow through the windings of the magnet until the beam path is back to its original form.

There is another factor to be considered. Large numbers of high velocity ions strike the collector pockets, receive an electron, and rebound from the collector. When the velocity of the ions is decreased, the number lost by rebound or bouncing is substantially reduced, thus increasing the effective yield of the calutron. It will therefore be seen that one function of the decelerating electrodes is to prevent loss by rebounding even though the accelerating potential is sufficient to produce a dense, high-velocity beam.

In addition to its function of determining the path of the beam, as above outlined, the decelerating electrode structure serves to bar the flow of electrons toward the arc block from the liner and interior of the tank. In and about the beam of ions is a region of plasma containing free electrons and negative ions produced by collision of particles and secondary emission from various parts of the apparatus. The accelerating electrodes act to accelerate electrons towards the block 14, as well as to withdraw positive ions away from the block. The flow of electrons from the accelerating electrodes to the arc block constitutes a drain current which materially increases the expense of operating the apparatus. However, the addition of the decelerating electrodes at a potential less negative than that of the accelerating electrodes introduces a negative gradient from the decelerating electrodes to the accelerating electrodes. Consequently, electrons in the tank beyond the accelerating electrodes tend to be repelled from rather than attracted to the vicinity of the arc block. Drain current is thus reduced to a minimum.

The foregoing discussion concerns apparatus representative of the class of devices to which the invention relates. Figs. 3 through 12, however, illustrate in detail an actual calutron constructed according to the invention. The general organization of the calutron appears in Figs. 3 and 5, wherein it will be seen that there is provided a large magnet having a lower pole face 50 and an upper pole face 52. A metal, arcuate, fluid-tight tank 60, interposed between the pole faces, includes a bottom wall 54, side walls 55, and a top 56. The tank 60 is held in place by wedges 58 driven at convenient intervals between the top 56 and the upper pole face 52. Adjacent one end of the tank 60 is an outlet 62 adapted to be coupled to a vacuum pumping system (not shown) by means of which the tank 60 can be evacuated to proper operating pressure. It has been found that a pressure of the order of $10^{-4}$ to $10^{-5}$ mm. Hg is satisfactory under normal conditions.

In order that the operation of the calutron may be observed from the exterior of the tank, there is provided a plurality of viewing ports 64, each of which comprises a tube let into the wall 55 of the tank 60 and supporting a glass plate or lens, the hole being sealed to prevent vacuum leaks in the tank 60.

Disposed within the tank 60 and shaped to conform to the configuration thereof is a tubular metal liner 66 supported in spaced relation from the walls of the tank 60 by means of a pair of supporting arms 68. At one end of the tank 60 the walls thereof terminate in an inturned flange or rim 70 to which is secured a rectangular metal face plate 72 dimensioned to fill the aperture within the rim 70 and secured thereto by means of a plurality of bolts 74 which serve to draw the face plate against the rim 70, there being gaskets interposed between them in order to effect a fluid-tight seal. At the opposite end of the tank 60, there is a similar rim 78 supporting a face plate 76 through which protrudes a stem 82 extending into the interior of the tank 60 and supporting at its inner end a suitable receiver or collector 80. A hollow, metal sleeve 84 surrounds the inner end of the stem 82 and the receiver 80 and extends slightly into the interior of the liner 66. Inserted into the other end of the liner 66 is a hollow metal sleeve 86; the liner 66 and the sleeves 84 and 86 serve to form a confined path from the source end of the calutron to the receiver element.

It is with the source mechanism that this invention particularly deals, and although the supporting elements are generally similar to those fully described in the above-mentioned application of Ernest O. Lawrence, they are shown in some detail, particularly in Figs. 4, 5, and 6. The face plate 72 is provided with an aperture in its upper central portion in which is journaled a sleeve or bushing 90 having a flange bearing against the inner surface of the face plate 72 and a threaded portion extending to the exterior of the tank 60 for the reception of a pair of internally threaded locking rings 92. The rings 92 are adjusted to provide for smooth rotation of the bushing 90 in the aperture of the face plate 70 but are tightened sufficiently to prevent wobbling thereof. A tubular stem member 94 extends through the bushing 90 and into the tank 60. Within the stem 94 is a pair of stiff water cooled leads 95 which support at their inner ends clamping blocks 100 into which are inserted the ends of a U-shaped filamentary cathode 102 of tungsten or other suitable material. The stem 94 is supported outside the tank by means of a supporting mechanism 98 secured on the end of a heavy glass insulator 96 which in turn is secured to the outer surface of the face plate 72. The details of the stem supporting mechanism will be found in the afore-mentioned application of Ernest O. Lawrence.

Figure 8:
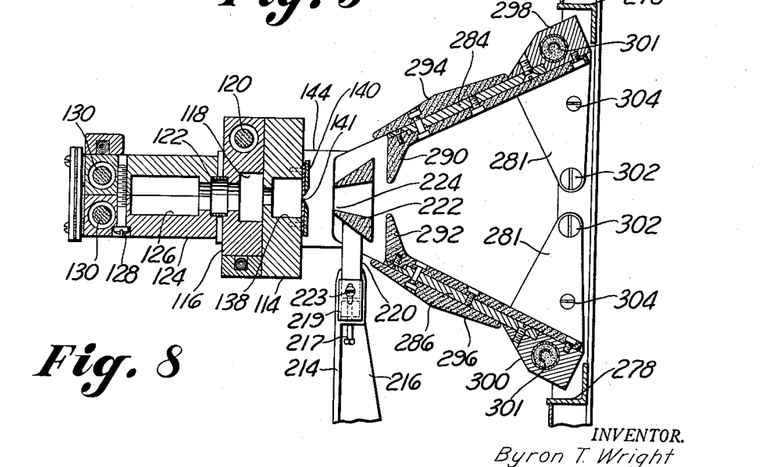
Fig. 8 is a view in cross section along the line 8—8 of Fig. 9.
Figure 9:
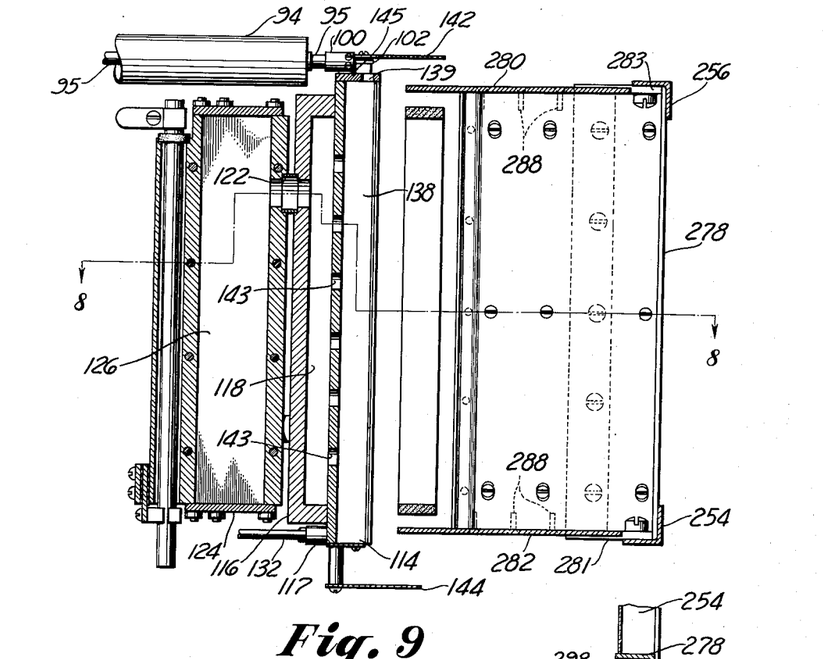
Fig. 9 is a view in cross section along the line 9—9 of Fig. 4.
Figure 10:
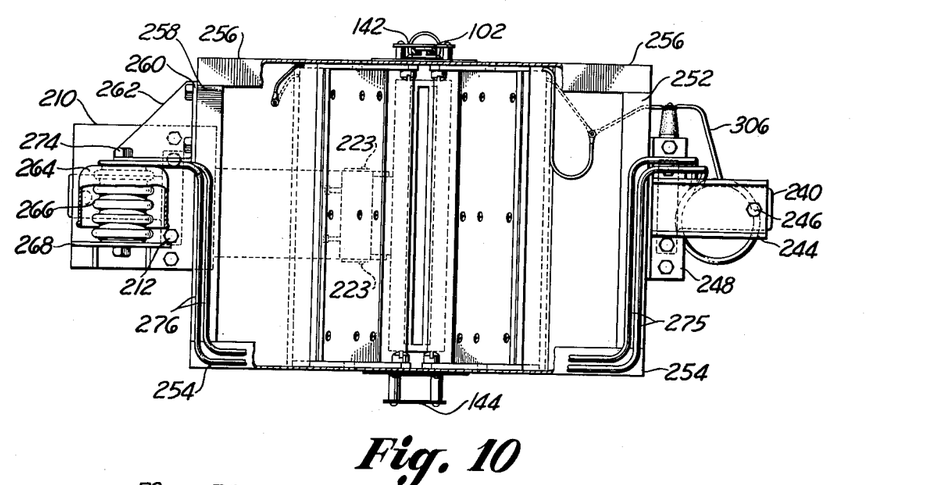
Fig. 10 is a view in end elevation of the inner end of the source mechanism.
Figures 11, 12:
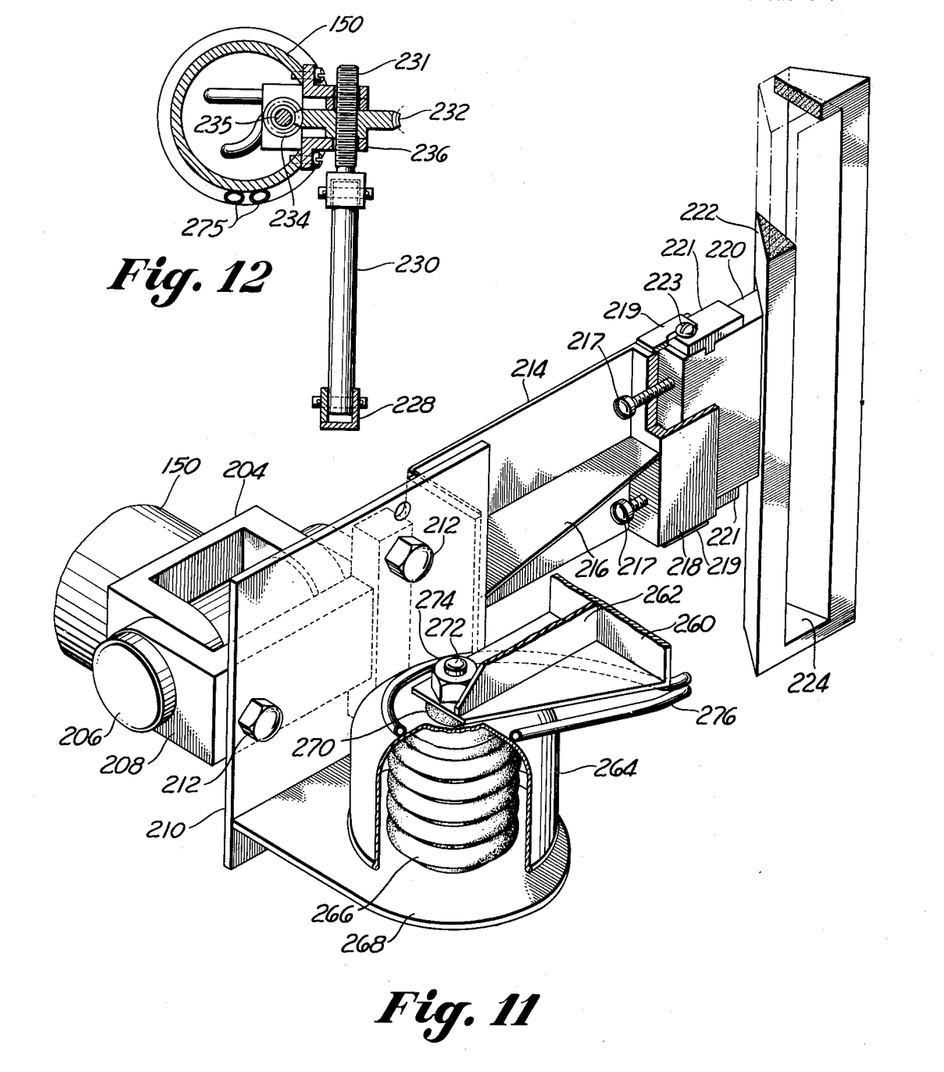
Fig. 11 is a view in perspective showing the mechanism for supporting the accelerating electrode and the decelerating electrodes.
Fig. 12 is a view in cross section along the line 12—12 of Fig. 4.

Mounted integrally with the bushing 90 is a depending support plate 106 which carries at its lower end a gear 107 meshing with a worm 108 that is controlled by a knob 109 (Fig. 7), mounted on the face plate 72, the elements being constructed and arranged so that the plate 106 may be swung back and forth by manipulation of the knob 109, the axis of rotation of the plate 106 being coincident with the axis of the cathode supporting stem 94. On each side of the plate 106 is mounted an arm 110 extending inwardly of the tank 60 and carrying a pivot pin 112. The pivot pins 112 serve as mountings for an arc block 114 to which is rigidly secured a distributing chamber block 116 and a vaporizing chamber block 124. As shown in Figs. 8 and 9, the arc block 114 contains a vertically elongated chamber 138 covered at its upper end by a plate 145 having a small aperture 139 directly underlying the filamentary cathode 102. The inner side of the arc chamber 138 is partially covered by a pair of face plates 140 secured to the inner surface of the block 114 and completely covering the chamber 138 except for a narrow slit 141. In the wall of the chamber 138 directly opposite the slit 141, there is formed a plurality of ports 143 which communicate with a vertically elongated distributing chamber 118 cut into the block 116. The block 116 is also bored to receive an electric Calrod heater 120.

Between the block 116 and the block 124, there is a bushing 122 which affords communication from the distributing chamber 118 to a vaporizing chamber 126 formed in the block 124. The block 124 also is bored to receive a pair of electric Calrod heaters 130. In the operation of the calutron, a charge of material to be vaporized is deposited in the vaporizing chamber 126 and the temperature thereof is thereupon elevated until the material vaporizes. Vapor traverses the bushing 122 and enters the distributing chamber 118 and thence through the ports 143 into the arc chamber 138. When the cathode 102 is energized, there is generated an arc discharge traveling from the filament down through the aperture 139 extending through the metal plate 145 disposed across the top of the arc chamber 138, through the chamber, and directly behind the slit 141; consequently molecules of vapor in the arc chamber 138 are struck by the electrons in the arc discharge and are thereupon disassociated and ionized in the manner explained previously. At the bottom of the arc block 114 is disposed a socket 117 which receives a long rod 132 extending into a gear box 134 secured to the inner surface of the face plate 72 and associated with a control knob 136 disposed on the outer surface of the face plate 72. Rotation of the control knob 136 acts through the gears in the gear box 134 to reciprocate the rod 132 and thus to swing the arc block 114 about the pivot pins 112, it being understood that the distributing chamber block 116 and the vaporizing chamber block 124 move with the arc block 114. It will now be seen that the arc block 114 may be adjusted in two directions by proper manipulation of the control knobs 109 and 136. Mounted on stand-off insulators secured to the top of the arc block 114 is a horizontal metal shield 142 arranged to overlie the filament 102 and the region in advance of the arc block 114. A similar shield 144 is mounted at the bottom of the arc block 114. The function of the shields 142 and 144 is to prevent electron oscillation between adjacent elements of the calutron and thereby to prevent the generation of excessive heat and resultant wear on the various elements.

A continuous conduit 146 enters the face plate 72, enters passages formed in the arc block 114, and leads back out through the face plate 72. Another continuous conduit 147 loops about the arms 110 to cool the block supporting mechanism. A cooling fluid may be passed through the conduits 146 and 147 in order to control the temperatures of the various elements as well as to provide means for quickly cooling the source mechanism in order that it may be withdrawn and handled as soon as possible after the termination of a run. The face plate 72 also provides means for mounting a pair of thermocouple leads 148 in order that the temperatures generated at the source unit may be continuously measured.

Disposed in advance of the slit 141 in the arc block 114 is an accelerating electrode 222 preferably formed of carbon and supported by a stem 150 which passes through the face plate 72 to the exterior of the tank 60. Beyond the accelerating electrode 222 is a pair of decelerating electrodes 290 and 292 which are supported on a frame secured to a stem 152. The stem 152 also passes through the face plate 72 to the exterior of the tank.

Means are provided for supporting and adjusting the stems 150 and 152, and since the means are substantially identical, it will only be necessary to describe in detail the mechanism used to support and adjust the stem 150. As shown particularly in Figs. 4 and 6, a heavy glass insulator 154 is sealed to the exterior of the face plate 72 by means of a collar 156 which works against an enlarged end of the insulator 154 and is drawn against the face plate 72 by means of nuts 158 cooperating with a plurality of studs 159 embedded in the face plate 72 and received in appropriate holes formed in the collar 156. Gaskets (not shown) are supplied to effect a vacuum-tight seal between the insulator 154 and the face plate 72. At its outer end the insulator 154 is also enlarged and provided with a rubber gasket 160 over which fit a pair of split rings 161 adapted to be clamped together by means of a collar 162. The collar 162 carries a series of bolts 163 which serve to draw the collar against a heavy metal plate 164, there being two ring gaskets 166 interposed between the plate 164 and the glass insulator 154. The stem 150 passes through the glass insualtor 154 into the interior of a metal sleeve 170 within which is a pair of loosely fitting brass supporting rings 172 which receive and support the stem 150. The sleeve 170 is provided with an annular flange 168 which is coupled to the plate 164 by two pairs of studs 174 and associated lock nuts 176. The studs fit into oversize holes in the flange 168 with the result that by manipulation of the lock nuts 176 the flange, and consequently the stem 150, may be tilted or canted with respect to the insulator 154 and the tank 60. A flexible expansible metal bellows 178 is secured to opposing surfaces of the plate 164 and the flange 168 and serves to maintain a vacuum seal therebetween as well as to accommodate the movement of the flange 168 with respect to the plate 164.

A heavy metal plate 180 is rigidly mounted on the flange 168 by means of a plurality of radially arranged studs 182. In its outer surface, the plate 180 is provided with an annular groove for the reception of a race of ball bearings 184 against which bears the inner surface of a ring gear 186. Three keepers 198 are secured to the plate 180 and bear against the outer surface of the ring gear 186 and prevent axial movement of the ring gear with respect to the plate 180. The ring gear 186 is threaded internally to engage threads on the outer surface of a hollow cup-shaped member 188 which carries on a flanged inner end 191 a bellows 190 also secured to the outer surface of the flange 168. The plate 180 carries a bracket 192 in which is journaled a worm 194 secured to a control rod 196 which extends across the face plate 72 to a similar worm associated with the supporting mechanism for the stem 152, the arrangement being such that both worms rotate together and effect identical adjustments. When the worm 194 causes the ring gear 186 to turn, the cup-shaped member 188 is translated axially in view of its threaded engagement with the ring gear and because the bellows 190 prevents it from rotating. The stem 150 is secured to the member 188 and is therefore translated axially therewith. By means of similar mechanism the stem 152 is also moved, and the result is to vary the distance between the arc block 114 and the accelerating and decelerating electrodes which are supported on the inner ends of the stems 150 and 152.

The outer end of the stem 150 threadedly engages the cup-shaped member 188 and protrudes therefrom. A split ring 200 is clamped about the extending end of the stem 150 by means of a bolt 199, and the ring 200 is provided with tapped holes for the reception of three bolts 202 which pass through the ring 200 and engage holes formed in the outer surface of the cup-shaped member 188. The stem 150 is provided with a ring or flange 201 rigidly secured thereto and grooved to receive a pair of ring gaskets 203 which bear against the inner surface of the bottom of the cup-shaped member 188. When the bolts 202 are tightened the ring 201 is drawn tightly against the bottom of the cup-shaped member 188, and the stem is thus in effect sealed to the member 188.

Within the tank 60 the stem 150 carries at its inner end a yoke 204 in which is journaled a pivot pin 206 in turn pivotally supporting a second yoke 208. A flat metal bracket 210 is secured to the yoke 208 by means of three bolts 212 and carries an arm 214 extending at right angles to the stem 150 in the direction of the arc block 114; the arm 214 has an integral stiffening member 216 extending along its length to render it rigid. Carried on the end of the arm 214 is a block 218 which is grooved to receive a second block 220. The block 220 is secured in place in the block 218 by means of a pair of cap screws 217. To the top and bottom of the block 218 is secured a pair of slotted guide plates 219 which cooperate with a pair of cap plates 221 secured to the top and bottom of the block 220. A pair of set screws 223 serve to clamp the block 220 in adjusted position with respect to the block 218. To make the adjustment the screws 217 and 223 are loosened and the block 220 is moved to the desired position, whereupon the set screws 223 are tightened and the cap screws 217 turned up until the block 220 is held rigidly in place.

At its outer end the block 220 carries an accelerating electrode 222 formed of carbon, graphite or other suitable material. The accelerating electrode 222 is elongated vertically and in horizontal cross section has a shape of a truncated triangle pierced by a diverging slit 224. The accelerating electrode 222 is so disposed that the slit 224 lies directly in advance of the slit 141 formed by the face plates 140 on the end of the arc block 114 and between the shields 142 and 144.

A long metal arm 226 is secured to the bracket 210, extends parallel to the stem 150, and slants downwardly until it joins a second arm 228 secured to the bottom of the bracket 210. Pivotally mounted on the end of the arm 228 is a vertical rod 230 pinned at its upper end to a socket carried by a threaded rod 231 which extends through the center of a pinion 232 carried in a bracket 236 secured to the stem 150. The pinion 232 meshes with a worm 234 carried on the end of a shaft 235 which is disposed inside the stem 150 and terminates in a nut 237 disposed adjacent the split ring 200 near the outer end of the stem 150. The rod 231 engages threads formed internally on the pinion 232, and it will be seen that when the nut 237 is manipulated to turn the shaft 235 and the worm 234, the pinion 232 turns and moves the rods 230 and 231 vertically thus tilting the arms 226 and 228 and causing the bracket 210 to pivot about the pin 206, thus adjusting the angular disposition of the accelerating electrode 222.

On the inner end of the stem 152 is carried a yoke 238 providing a journal for a pivot pin 240 which carries a second yoke 242 upon which is mounted a bracket 244 secured to the yoke 242 by means of a plurality of bolts 246. An arm 248, secured to the bracket 244, extends parallel to the stem 152 in the same manner as the arm 226 and is associated with a rod 251 and a gear 250. The gear 250 cooperates with a worm 253 in the same fashion as the gear 232 cooperates with the worm 234, so that by manipulating a nut 255 the bracket 244 may be angularly adjusted.

To the inner end of the bracket 244 is secured an upright bracket 252 supporting a lower transverse arm 254 of angle iron and an upper angle iron arm 256. A second upright frame member 258 is secured to the opposite ends of the arms 254 and 256 and to an L-shaped bracket 260 having a stiffener 262 and secured to a stud 272 carried on the upper end of an insulator 266 which in turn is mounted upon a flat plate 268 secured to the bracket 210. Surrounding the insulator 266 is an inverted cup-shaped shield 264 of light metal spaced from the plate 268. The function of the shield 264 is to protect the insulator 266 from conducting deposits of condensed vapor or other material within the tank 60. A nut 274 clamps the bracket 260 to the stud 272, there being an insulating washer 270 disposed between the top of the shield 264 and the bracket 260.

The brackets 252 and 258 form with the arms 254 and 256 a supporting frame of angle irons upon which the decelerating electrode structure is mounted. Secured between the arms 254 and 256 is a pair of upright supports 278 which serve to strengthen and stiffen the supporting frame. Secured to the lower arm 254 between the supports 278 is a pair of triangular plates 281, held in place by screws 302 and 304, which in turn support a large lower plate 282. Similarly, a pair of triangular plates 283 secured to the upper arm 256 provide support for an upper plate 280. The upper and lower plates 280 and 282 are roughly triangular in shape and approach an apex as they extend toward the block 114. A pair of upright metal plates 284 and 286 are supported between the plates 280 and 282 and secured thereto by means of a plurality of small screws 288. The plates 284 and 286 are disposed at an acute angle, being nearer together as they approach the arc block 114. To the inner surface of the plate 284 there is secured a sheet of carbon or graphite having an inwardly extending lug 290 disposed adjacent the accelerating electrode 222.

Similarly, a sheet of carbon or graphite is secured to the plate 286 and has an integral lug 292 extending inwardly and lying opposite the member 290. The distance between the lugs 290 and 292 is slightly less than the width of the slit 224 at its widest dimension and serves to narrow the beam of ions. The elements 290 and 292 function as decelerating electrodes and carry a potential intermediate that of the accelerating electrode 222 and the arc block 114. A wear plate 294 of carbon or graphite is secured to the outer surface of the plate 284 and a similar plate 296 is secured to the outer surface of the plate 286. The plates 294 and 296 absorb electron bombardment and protect the metal plates 284 and 286. An elongated metal block 298 is secured to the plate 284 and is bored to receive an electric resistance heater 301. A similar electric heater is carried in a block 300 secured to the plate 286. The function of the heaters is to elevate the temperature of the decelerating electrodes and their supporting mechanism to a point above the melting point of such material as may be present in the tank to prevent condensation of vapor on the decelerating electrode structure. One side of each of the heaters 301 is grounded to the supporting structure and a lead 306 extends through the stem 152 to supply current to the other side of the heaters 301. To provide means for further controlling the temperature of the decelerating electrode support structure as well as the stem 152, a conduit 276 for a fluid coolant is wrapped around the stem 152 and carried across the inner face of the supporting frame for the decelerating electrode as far as the shield 264 on the insulator 266. The stem 150 is cooled by means of a similar conduit 275 extending through the stem 150 into the interior of the tank, where it is led outside of the stem 150 and wrapped around it. The cooling conduits 275 and 276 may be used to reduce the temperature of the elements during operation of the calutron or to reduce the temperature thereof after a run in order that the elements may be handled a short time after the run has been stopped.

Figure 2:
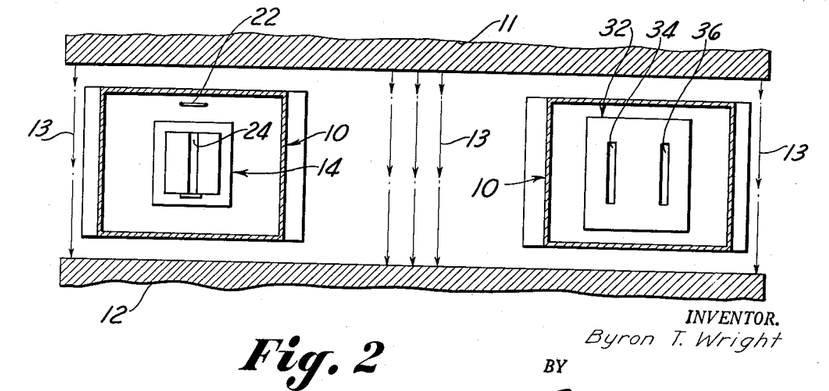
Fig. 2 is a view in cross section along the line 2—2 of Fig. 1.
Figure 3:
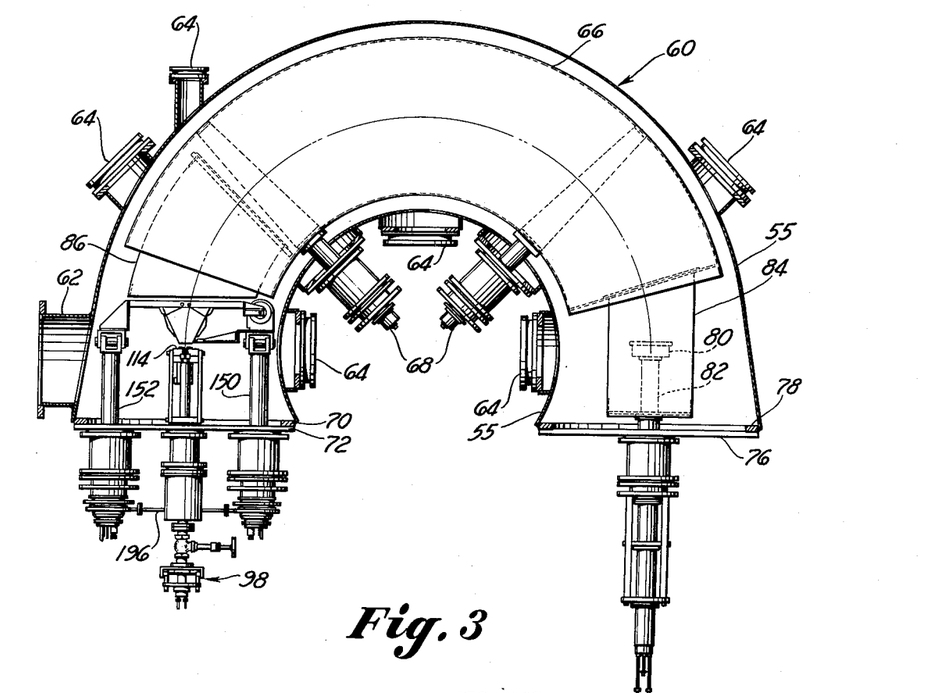
Fig. 3 is a plan view partly in cross section of a calutron constructed according to the invention.
Figure 4:
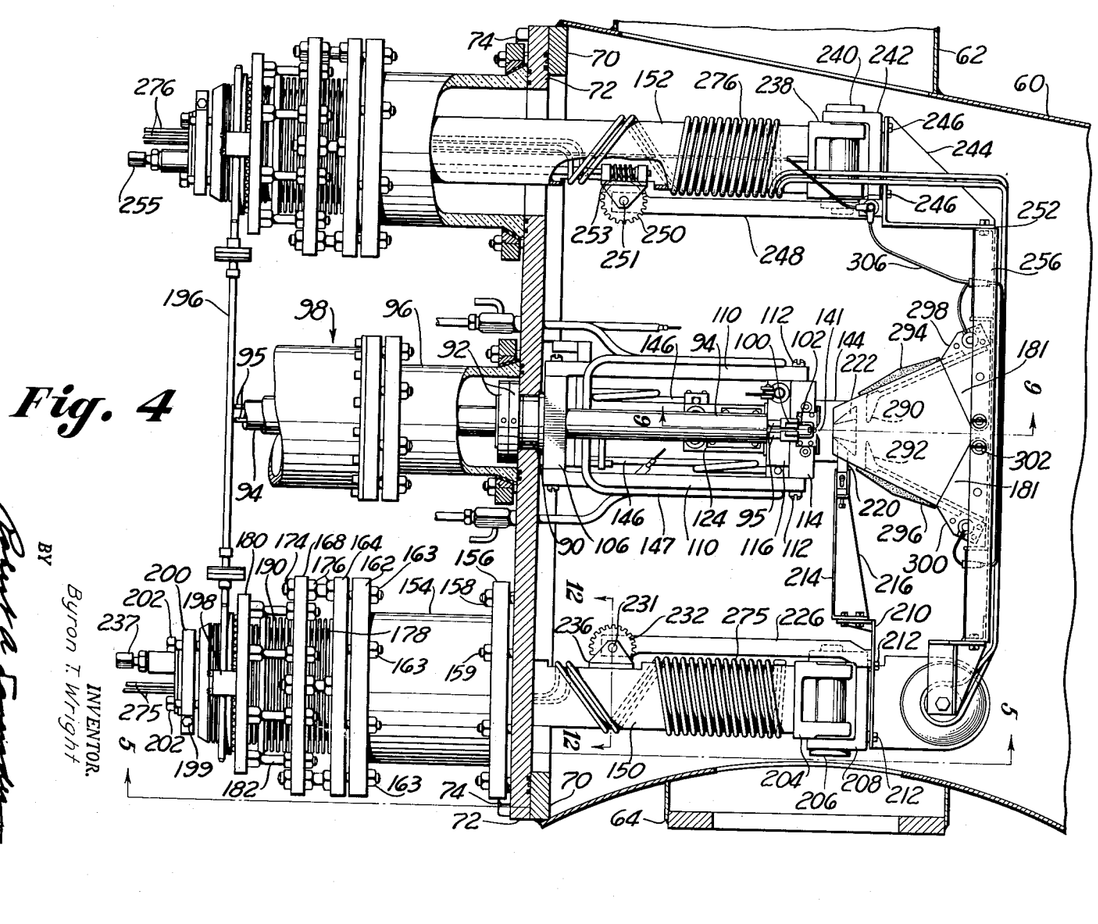
Fig. 4 is a plan view illustrating details of the source end of the calutron shown in Fig. 3.
Figure 5:
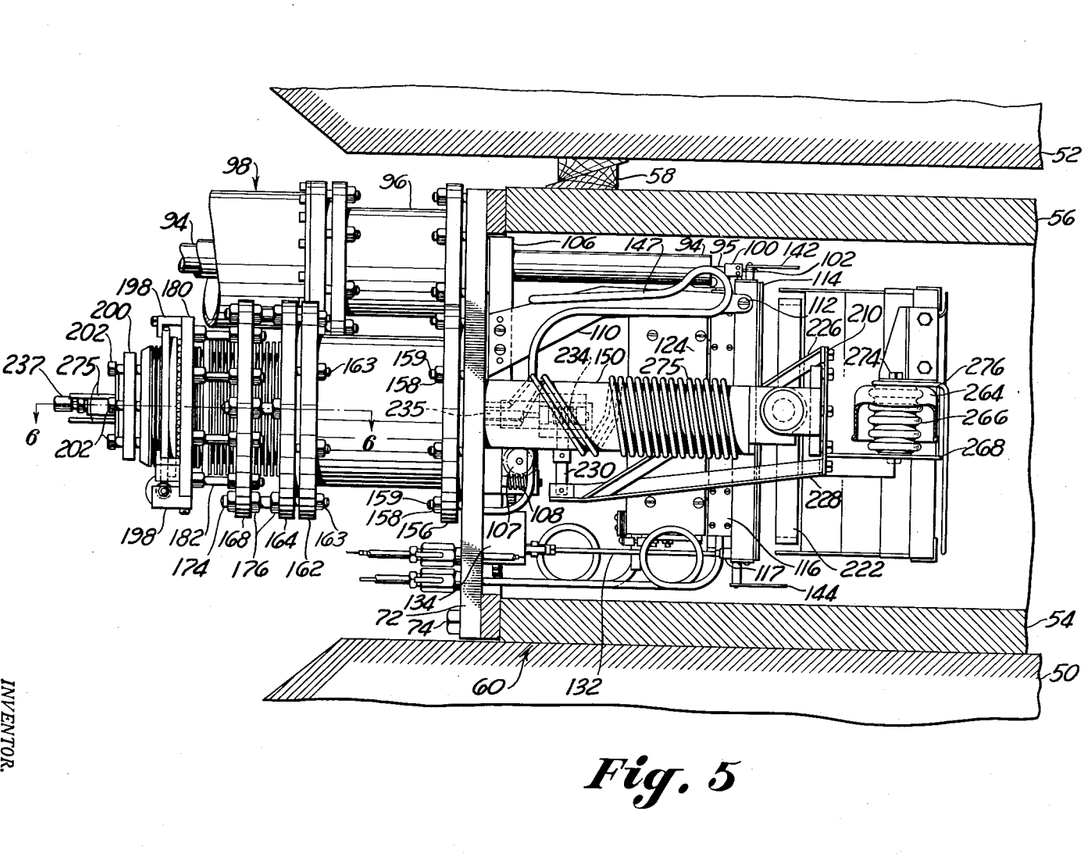
Fig. 5 is a view in side elevation of the source mechanism.
Figure 6:
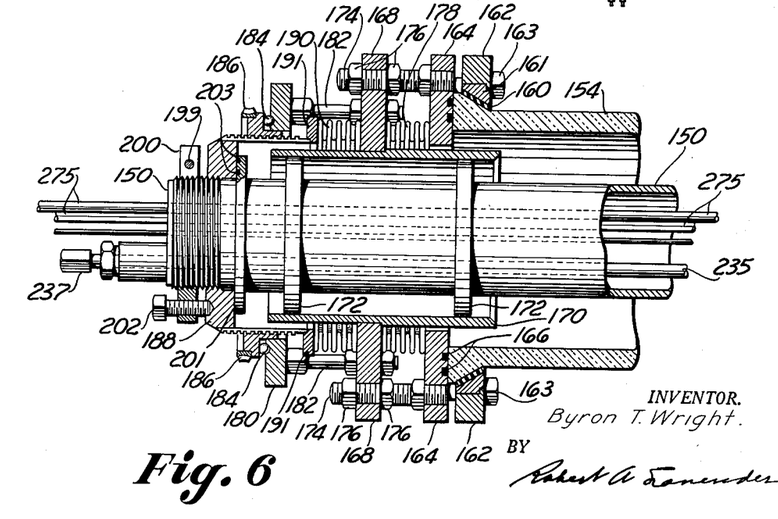
Fig. 6 is a view in cross section along the line 6—6 of Fig. 5.
Figure 7:
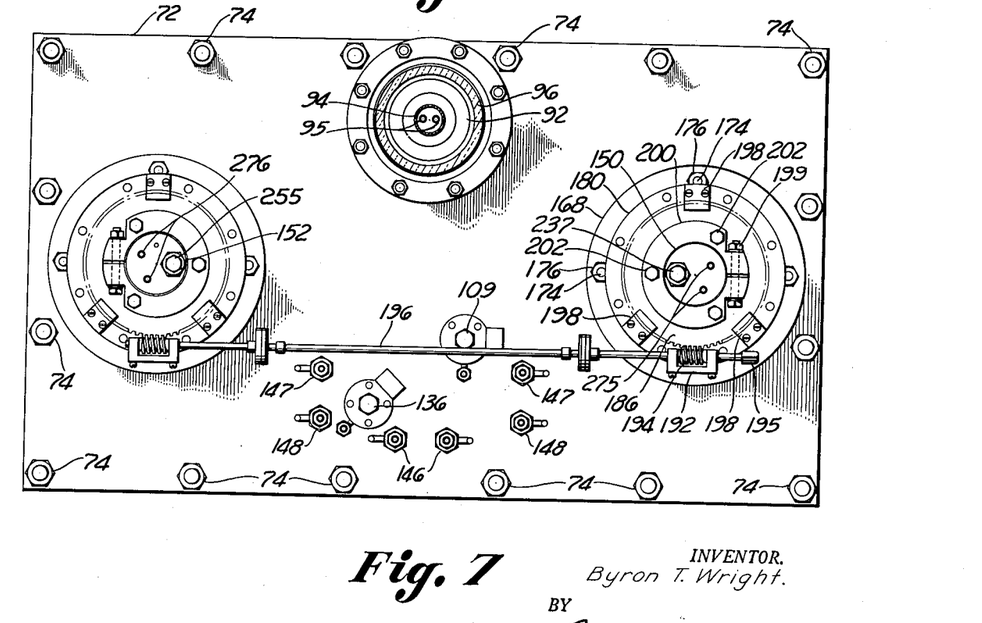
Fig. 7 is a view in end elevation of the face plate at the source end of the calutron.

The calutron illustrated in Figs. 3 to 12 functions in the same manner as that diagrammatically shown in Figs. 1 and 2, and no useful purpose would be served by repeating the discussions of the functions of the various elements at this point. The entire accelerating and decelerating electrode structure may be moved in and out with respect to the slit 141 by manipulation of the nut 195, in order to secure the optimum operating conditions with respect to the character of the electric field between the accelerating electrode and the block and with respect to the shape of the plasma at slit 141. The control knobs 109 and 136 provide for accurate adjustment of the position of the arc block 114 in two planes, and by manipulating the nuts 237 and 255 the angular disposition of the accelerating and decelerating electrode structure with respect to the arc block may be adjusted. It should be pointed out that the adjustments referred to herein may all be made while the apparatus is in operation.

It is to be understood that the apparatus illustrated in Figs. 3 to 12 and described herein represents one preferred embodiment of the invention, and that the scope of the invention is not limited to the several details shown but rather by reference to the claims appended hereto.

Having now described and illustrated my invention, what I claim as new and desire to secure by Letters Patent of the United States is:

1. A calutron having an ion source and a predetermined path for ions extending therefrom, means for imparting to said ions energy in an amount greater than enough to impel said ions to follow said path, and means for withdrawing from said ions prior to their traverse of said path energy in excess of the amount required for said traverse.

2. Apparatus comprising means for establishing a magnetic field, an evacuated vessel disposed within said field, an ion-producing mechanism disposed within said vessel, a predetermined path for ions extending through said vessel, means for withdrawing ions from said mechanism and for forming a beam of ions having an energy in excess of that sufficient to cause said ions to follow said path, and means for withdrawing from said ions prior to their traverse of said path the energy in excess of the amount required for said traverse.

3. Apparatus comprising means for establishing a magnetic field, an evacuated vessel disposed within said field, mechanism disposed in said vessel for producing ions, means for withdrawing ions from said mechanism and for imparting to the withdrawn ions energy in excess of that required to cause said ions to traverse a predetermined path in said vessel, and means for removing from said ions prior to their traversal of said path the energy in excess of that required for said traversal.

4. Apparatus comprising means for establishing a magnetic field, an evacuated vessel disposed within said field, mechanism disposed in said vessel for producing ions, means for withdrawing ions from said mechanism and for imparting to the withdrawn ions energy in excess of that required to cause said ions to traverse a predetermined path in said vessel, and means for removing the excess energy from said ions prior to their traversal of said predetermined path.

5. In apparatus for projecting a beam of ions through an evacuated vessel including an ion source disposed in said vessel and means for establishing a magnetic field encompassing said vessel; the combination of an electrode charged negatively with respect to said source for predetermining the path followed by an ion beam in said vessel, and accelerating means charged negatively with respect to said electrode and interposed between said source and said electrode for withdrawing ions from said source and for imparting to the withdrawn ions energies in excess of the amount required to cause said ions to traverse said predetermined path, the electrode serving to remove the excess energy from said ions prior to their traversal of said predetermined path.

6. Apparatus comprising a substantially evacuated tank, means for establishing a magnetic field along a given axis through said tank, means disposed in said tank for producing ions of a charge material, means including a first electrode charged negatively with respect to said ion producing means and disposed adjacent said ion-producing means for withdrawing ions therefrom and for accelerating the withdrawn ions and for forming a beam of ions, means including a second electrode charged less negatively than said first electrode and disposed adjacent said first electrode for decelerating the ions of the beam and for projecting said beam along a predetermined path disposed substantially transversely of said magnetic field.

7. A calutron comprising a substantially fluid-tight tank, means for evacuating said tank, means for establishing a magnetic field along a given axis through said tank, an ion source unit disposed in said tank and arranged to produce ions of a material to be treated, means including a first electrode charged negatively with respect to said ion source and disposed adjacent said source unit for withdrawing ions therefrom and for accelerating the withdrawn ions to relatively high velocities and for forming a relatively dense beam of the high velocity ions, means including a second electrode charged less negatively than said first electrode and disposed adjacent to said first electrode for decelerating the ions of the beam to relatively low velocities and for projecting said beam along a predetermined path disposed substantially transversely of said magnetic field, and a receiver disposed in said tank and arranged in the path of said beam of ions and adapted to de-ionize the ions of said beam and to collect the resulting material.

8. A device comprising a substantially fluid-tight tank, means for evacuating said tank, means for establishing a magnetic field along a given axis through said tank, an ion source disposed in said tank and arranged to produce ions of a material to be treated, means including a first electrode charged negatively with respect to said ion source and disposed adjacent to said source unit for withdrawing ions therefrom and for accelerating the withdrawn ions to given velocities and for forming a beam of the given velocity ions, means including a second electrode charged less negatively than said first electrode and disposed adjacent said first electrode for decelerating the ions of the beam to other velocities and for projecting said beam along a predetermined path disposed substantially transversely of said magnetic field and an electrode disposed in said tank and arranged in the path of said beam of ions and adapted to de-ionize the ions of said beam.

9. The method comprising producing ions of a material to be treated, accelerating the ions produced to relatively high velocities and forming a relatively dense beam of the high velocity ions, decelerating the ions of the beam to relatively low velocities and projecting the beam through a space traversed by a magnetic field substantially transversely thereto, de-ionizing the ions of the beam, and collecting the resulting material.

10. A calutron comprising a substantially fluid-tight tank, means for evacuating said tank, means for establishing a magnetic field along a given axis through said tank, an ion source unit disposed in said tank and arranged to produce ions of a material to be treated, a first electrode disposed adjacent to said source unit, a second electrode disposed adjacent to said first electrode, means for applying a relatively high negative potential to said first electrode with respect to said source unit in order to withdraw from said source unit a copious supply of ions and to accelerate the withdrawn ions to relatively high velocities and to form a relatively dense beam of high velocity ions, means for applying a relatively low negative potential to said second electrode with respect to said source unit in order to decelerate the ions of the beam to relatively low velocities and to project said beam along a predetermined path disposed substantially transversely of said magnetic field, and a receiver disposed in said tank and arranged in the path of said beam of ions and adapted to de-ionize the ions of said beam and to collect the resulting material.

11. A calutron comprising means for establishing a magnetic field, a vessel disposed within said field, means disposed within said vessel for generating a beam of ions having a given speed, and means for modifying the initial speed of the ions of the beam prior to their traversal of the vessel to cause the beam to follow a predetermined path therethrough.

12. The method which comprises forming ions in a source, withdrawing positive ions from said source, accelerating said ions to form a beam, and interposing in the path of the beam a potential drop adjacent the point of beam acceleration serving to prevent the impulsion of electrons along the path of the beam toward said source and to decelerate the ions forming said beam.

References Cited in the file of this patent

UNITED STATES PATENTS

| | | |
|---|---|---|
| 2,221,467 | Bleakney | Nov. 12, 1940 |
| 2,331,189 | Hipple | Oct. 5, 1943 |
| 2,331,190 | Hipple | Oct. 5, 1943 |
| 2,341,551 | Hoover | Feb. 15, 1944 |
| 2,355,658 | Lawlor | Aug. 15, 1944 |
| 2,370,673 | Langmuir | Mar. 6, 1945 |
| 2,378,936 | Langmuir | June 26, 1945 |

OTHER REFERENCES

Tate et al: Physical Review, vol. 48, September 15, 1935, pp. 525–531.

Lamar et al: Physical Review, vol. 51, June 1, 1937, pp. 936–941.